M. EHRLICH.
LARDING PIN.
APPLICATION FILED OCT. 12, 1912.
1,060,440.
Patented Apr. 29, 1913.
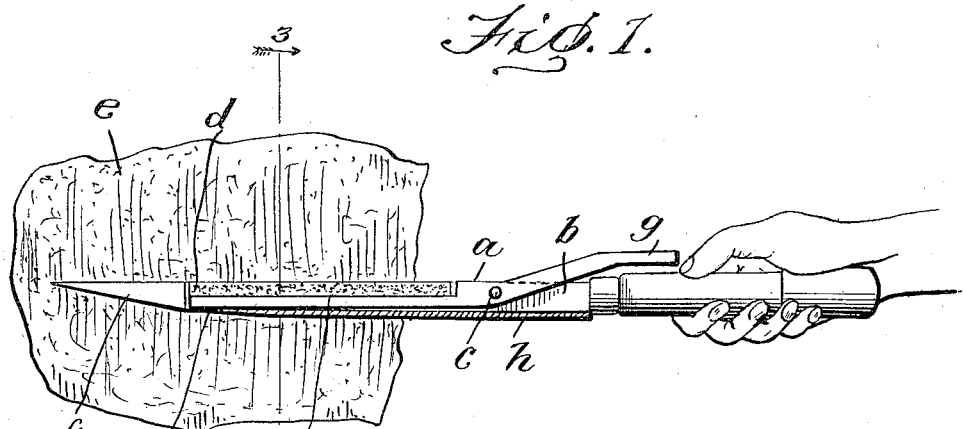
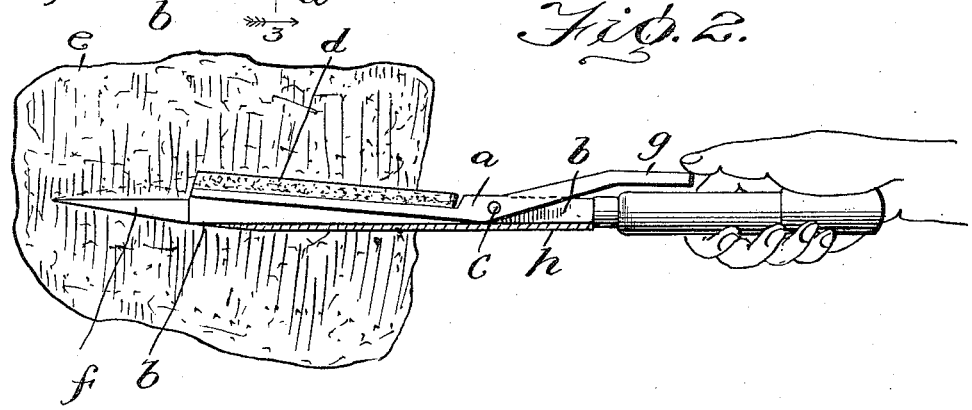
Inventor
Meta Ehrlich

UNITED STATES PATENT OFFICE.

META EHRLICH, OF GOHLIS, NEAR LEIPZIG, GERMANY.

LARDING-PIN.

1,060,440.   Specification of Letters Patent.   Patented Apr. 29, 1913.

Application filed October 12, 1912. Serial No. 725,473.

*To all whom it may concern:*

Be it known that I, META EHRLICH, a subject of the Emperor of Germany, and resident at Gohlis, near Leipzig, Germany, have invented certain new and useful Improvements in Larding-Pins.

My present invention relates to larding-pins and has for its object to provide an improved device of this kind, made of U-shaped cross-section and having sharp edges.

The invention comprises novel features of construction and combinations of parts fully described hereinafter and specifically pointed out in the appended claims, and said invention will be readily understood from the following description taken in connection with the accompanying drawings, wherein:

Figure —1.— is a sectional side elevation of the improved larding-pin in inoperative position; Fig. —2.— is a similar view, showing the larding-pin in operative position; Fig. —3.— shows a cross-section of the larding-pin.

The improved larding-pin is composed of a shaft $b$, made of U-shaped cross-section and having sharp edges; at the front end said shaft terminates into a point $f$, while the rear end thereof is provided with a handle. Pivotally arranged at $c$ within the hollow shaft $b$ is a two-armed lever $a$, the front arm $a^1$ of which is held on the bottom of the hollow shaft by a spring $h$ in its inoperative position.

The improved larding-pin is used as follows: From the bacon or the like previously cut in slices, I cut a narrow slice $d$ by means of the sharp edges of the shaft $b$, said narrow slice resting on the front-arm $a^1$ of the lever $a$, whereupon I push the shaft $b$ to the desired depth into the meat to be larded, without touching the rear arm $g$ of the lever $a$. Now I depress said rear arm $g$ in order to raise the slice of bacon $d$ from the hollow shaft $b$, whereupon I withdraw the pin from the meat, the slice of bacon remaining in its former state within the hole made by the pin.

Of course any other material, such as spices can be easily introduced into the meat by means of my improved larding-pin.

I claim:

1. In a larding-pin the combination with a pin made of U-shaped cross-section and having sharp edges, of a two armed-lever, pivotally arranged within the hollow U-shaped pin, means for normally holding the front arm of said lever on the bottom of the U-shaped pin so that a slice of bacon may be laid upon said arm prior to the introduction of the pin into the meat, and means for raising the bacon carrying arm after the pin is introduced into the meat, substantially as set forth.

2. In a larding pin the combination with a pin made of U-shaped cross-section and having sharp edges, of a two-armed lever, pivotally arranged within the hollow U-shaped pin, a spring arranged to normally hold the front arm of said lever on the bottom of the U-shaped pin, the rear arm of said lever being made of the shape of a thumb-lever, whereby the front arm may be easily raised after the pin is introduced into the meat, substantially as set forth.

In testimony whereof I have set hereunto my hand in presence of two witnesses.

META EHRLICH.

Witnesses:
  PAUL EHRLICH,
  RUDOLPH FRICKE.

---

Copies of this patent may be obtained for five cents each, by addressing the "Commissioner of Patents, Washington, D. C."